(12) United States Patent
Feldman et al.

(10) Patent No.: US 8,036,958 B2
(45) Date of Patent: Oct. 11, 2011

(54) COMPUTER IMPLEMENTED SYSTEM FOR DETERMINING A DISTRIBUTION POLICY FOR A SINGLE PERIOD INVENTORY SYSTEM, OPTIMIZATION APPLICATION THEREFOR, AND METHOD THEREFOR, AND DECISION SUPPORT TOOL FOR FACILITATING USER DETERMINATION OF A DISTRIBUTION POLICY FOR A SINGLE PERIOD INVENTORY SYSTEM

(75) Inventors: Bart C. Feldman, Lexington, MA (US); Michael Aronowich, Haifa (IL); Ofra Natan, Hod Hasharon (IL); Sofia Mariamova, Ashdod (IL); Henry Harel, Tel Aviv (IL)

(73) Assignee: Demantra Ltd., Ramat Gan (IL)

( * ) Notice: Subject to any disclaimer, the term of this patent is extended or adjusted under 35 U.S.C. 154(b) by 47 days.

(21) Appl. No.: 12/693,311

(22) Filed: Jan. 25, 2010

(65) Prior Publication Data

US 2010/0169167 A1    Jul. 1, 2010

Related U.S. Application Data (62) Division of application No. 10/407,201, filed on Apr. 7, 2003, now Pat. No. 7,664,683.

(60) Provisional application No. 60/370,143, filed on Apr. 8, 2002.

(51) Int. Cl.
  *G06Q 10/00* (2006.01)

(52) U.S. Cl. ............ 705/28; 705/22; 705/7.12; 717/151

(58) Field of Classification Search ........................ None
See application file for complete search history.

(56) References Cited

U.S. PATENT DOCUMENTS

| | | | |
|---|---|---|---|
| 4,744,027 A | 5/1988 | Bayer et al. | |
| 5,596,493 A | 1/1997 | Tone et al. | |
| 5,946,662 A | 8/1999 | Ettl et al. | |
| 6,144,945 A | 11/2000 | Garg et al. | |
| 6,341,269 B1 | 1/2002 | Dulaney et al. | |
| 6,826,538 B1 | 11/2004 | Kalyan et al. | |
| 6,944,598 B1 | 9/2005 | Cline | |
| 7,092,929 B1 * | 8/2006 | Dvorak et al. | 705/28 |
| 7,136,830 B1 | 11/2006 | Kuelbs et al. | |
| 7,240,027 B2 | 7/2007 | McConnell et al. | |
| 2003/0033180 A1 | 2/2003 | Shekar et al. | |

OTHER PUBLICATIONS

Bell, Peter C., A New Procedure for the Distribution of Periodicals, The Journal of Operational Research Society, vol. 29, No. 5, May 1978, pp. 427-434.

* cited by examiner

*Primary Examiner* — Luna Champagne
(74) *Attorney, Agent, or Firm* — Kilpatrick Townsend & Stockton LLP (57) ABSTRACT

Computer implemented system for determining a distribution policy for a single period inventory system on the basis of the relative merit of allocating a draw unit of one of a multitude of different consumer items to one of a multitude of different locations in accordance with an allocation decision criterion subject to one or more constraints, an optimization application therefor, and method therefor, and including a Decision Support Tool for facilitating user determination of a distribution policy for a single period inventory system.

20 Claims, 10 Drawing Sheets

FIG.1

| ITEM | LOCATION | DATE | SALES | DRAW | RETURNS |
|---|---|---|---|---|---|
| 1 | 1 | 17.11.01 | 30 | 30 | 0 |
| 1 | 1 | 18.11.01 | 33 | 35 | 2 |
| 1 | 1 | 19.11.01 | 32 | 34 | 2 |
| 1 | 1 | 20.11.01 | 31 | 37 | 6 |
| 1 | 2 | 17.11.01 | 33 | 37 | 4 |

| | DELIVERY | | | INCREMENTAL AVAILABILITY | | |
|---|---|---|---|---|---|---|
| ITERATION | LOCATION 1 | LOCATION 2 | LOCATION 3 | LOCATION 1 | LOCATION 2 | LOCATION 3 |
| 0 | 12 | 45 | 108 | 7.3% | 3.8% | 2.6% |
| 1 | 13 | 45 | 107 | 5.2% | 3.8% | 2.6% |
| 2 | 14 | 45 | 106 | 3.5% | 3.8% | 3.0% |
| 3 | 14 | 46 | 105 | 3.5% | 3.3% | 3.2% |
| 4 | 15 | 46 | 104 | 2.2% | 3.3% | 3.4% |
| FINAL SAFETY STOCK | 5 | 6 | 4 | | | |

| DECREMENTAL AVAILABILITY | | | ALLOCATE TO: | FROM: | %SA | %ESO | %ER | %ES | %EST |
|---|---|---|---|---|---|---|---|---|---|
| LOCATION 1 | LOCATION 2 | LOCATION 3 | | | | | | | |
| 9.5% | 4.4% | 2.8% | 1 | 3 | 80.2% | 19.8% | 10.7% | 89.4% | 1.6% |
| 7.3% | 4.4% | 3.0% | 1 | 3 | 81.7% | 18.3% | 10.7% | 89.3% | 1.6% |
| 5.2% | 4.4% | 3.2% | 2 | 3 | 82.4% | 17.6% | 10.7% | 89.3% | 1.6% |
| 5.2% | 3.8% | 3.4% | 1 | 3 | 82.6% | 17.4% | 10.8% | 89.2% | 1.7% |
| 3.5% | 3.8% | 3.6% | STOP: MAX INCREMENTAL <=MIN DECREMENTAL | | 82.6% | 17.4% | 10.9% | 89.1% | 1.8% |
| | | | | | | | | | |

| ADDITIONAL SAFETY STOCK UNIT | DRAW | | | INCREMENTAL AVAILABILITY | | | WINNING LOCATION | TERMINATION CRITERION | | |
|---|---|---|---|---|---|---|---|---|---|---|
| | LOCATION 1 | LOCATION 2 | LOCATION 3 | LOCATION 1 | LOCATION 2 | LOCATION 3 | | EXPECTED RETURN % (%ER) | EXPECTED SELLOUT % (%ESO) | EXPECTED STOCKOUT % (%EST) |
| 0 | 10 | 40 | 100 | 11.4% | 6.1% | 3.9% | 1 | 5.2% | 45.0% | 5.2% |
| 1 | 11 | 40 | 100 | 9.5% | 6.1% | 3.9% | 1 | 5.5% | 41.2% | 4.9% |
| 2 | 12 | 40 | 100 | 7.3% | 6.1% | 3.9% | 1 | 5.9% | 38.0% | 4.6% |
| 3 | 13 | 40 | 100 | 5.2% | 6.1% | 3.9% | 2 | 6.4% | 35.6% | 4.5% |
| 4 | 13 | 41 | 100 | 5.2% | 5.8% | 3.9% | 2 | 6.7% | 33.5% | 4.1% |
| 5 | 13 | 42 | 100 | 5.2% | 5.4% | 3.9% | 2 | 7.1% | 31.6% | 3.9% |
| 6 | 13 | 43 | 100 | 5.2% | 4.9% | 3.9% | 1 | 7.5% | 29.8% | 3.6% |
| 7 | 14 | 43 | 100 | 3.5% | 4.9% | 3.9% | 2 | 8.0% | 28.0% | 3.5% |
| 8 | 14 | 44 | 100 | 3.5% | 4.4% | 3.9% | 2 | 8.4% | 26.4% | 3.3% |
| 9 | 14 | 45 | 100 | 3.5% | 3.8% | 3.9% | 3 | 8.8% | 24.9% | 3.1% |
| 10 | 14 | 45 | 101 | 3.5% | 3.8% | 3.9% | 3 | 9.1% | 23.6% | 2.8% |
| 11 | 14 | 45 | 102 | 3.5% | 3.8% | 3.8% | 2 | 9.4% | 22.3% | 2.5% |
| 12 | 14 | 46 | 102 | 3.5% | 3.3% | 3.8% | 3 | 9.8% | 21.0% | 2.4% |
| 13 | 14 | 46 | 103 | 3.5% | 3.3% | 3.6% | 3 | 10.1% | 19.8% | 2.1% |
| 14 | 14 | 46 | 104 | 3.5% | 3.3% | 3.4% | 3 | 10.4% | 18.6% | 1.9% |
| 15 | 15 | 46 | 104 | 2.2% | 3.3% | 3.4% | 1 | 10.9% | 17.4% | 1.9% |
| 16 | 15 | 46 | 105 | 2.2% | 3.3% | 3.2% | 2 | 11.3% | 16.3% | 1.6% |
| 17 | 15 | 47 | 105 | 2.2% | 2.7% | 3.2% | 3 | 11.7% | 15.2% | 1.5% |
| 18 | 15 | 47 | 106 | 2.2% | 2.7% | 3.0% | 3 | 12.1% | 14.1% | 1.4% |
| 19 | 15 | 47 | 107 | 2.2% | 2.7% | 2.8% | 3 | 12.4% | 13.1% | 1.2% |
| 20 | 15 | 47 | 108 | | | | | 12.8% | 12.2% | 1.1% |

| EXPECTED RETURN(%ER) | EXPECTED SELLOUT(%ESO) | DRAW | | |
|---|---|---|---|---|
| | | LOCATION 1 | LOCATION 2 | LOCATION 3 |
| 5.5% | 42.0% | 11 | 40 | 100 |
| 7.5% | 30.6% | 13 | 43 | 100 |
| 9.3% | 23.2% | 14 | 45 | 102 |
| 11.4% | 15.9% | 14 | 46 | 107 |
| 13.5% | 10.8% | 15 | 48 | 109 |
| 15.6% | 7.1% | 16 | 49 | 112 |
| 17.6% | 4.5% | 16 | 51 | 115 |
| 19.3% | 2.9% | 17 | 52 | 117 |
| 21.4% | 1.7% | 18 | 53 | 120 |
| 23.4% | 0.9% | 19 | 55 | 122 |

COMPUTER IMPLEMENTED SYSTEM FOR DETERMINING A DISTRIBUTION POLICY FOR A SINGLE PERIOD INVENTORY SYSTEM, OPTIMIZATION APPLICATION THEREFOR, AND METHOD THEREFOR, AND DECISION SUPPORT TOOL FOR FACILITATING USER DETERMINATION OF A DISTRIBUTION POLICY FOR A SINGLE PERIOD INVENTORY SYSTEM

CROSS-REFERENCES TO RELATED APPLICATIONS

This application is a Divisional of U.S. patent application Ser. No. 10/407,201, filed on Apr. 7, 2003, which claims the benefit of U.S. Provisional Application No. 60/370,143, filed on Apr. 8, 2002, each of which is incorporated by reference in its entirety for all purposes.

FIELD OF THE INVENTION

The invention is in the field of determining distribution policies for single period inventory systems.

GLOSSARY OF TERMS

The following terms listed alphabetically together with their acronyms are employed in the description and claims of this application with respect to the present invention:

Availability $A_{ij}$, and System Availability Percentage % SA

Availability $A_{ij}$ is an industry term referring to the probability of completely satisfying the demand for an $i^{th}$ consumer item where i=1, 2, ..., m at a $j^{th}$ location where j=1, 2, ..., n of a single period inventory system without an occurrence of a sellout due to insufficient draw at that location. In mathematical terms, $A_{ij}=F(\lambda_{ij},D_{ij})$ where F is the cumulative probability distribution function (cdf) of demand for the $i^{th}$ consumer item at the $j^{th}$ location, and $\lambda_{ij}$ and $D_{ij}$ are its mean demand and draw, respectively. The probability distribution function in the discrete case and the probability density function in the continuous case are both denoted by the letter "f". The System Availability Percentage % SA for a single period inventory system is given by % SA=$100\Sigma\Sigma A_{ij}$/mn=100-% ESO.

Demand $X_{ij}$, mean demand $\lambda_{ij}$, and mean demand matrix $\lambda$

The demand process for a consumer item at a location has a random but non-stationary nature, and therefore cannot be subjected to ensemble inferences based on a single realization. Mean demands $\lambda_{ij}$ for a consumer item at a location over time are presupposed to be the outcome of a stochastic process which can be simulated by a forecast model whilst the demand $X_{ij}$ for an $i^{th}$ consumer item at a $j^{th}$ location of a single period inventory system at a future point in time is a random variable with a conditional probability distribution conditioned on its mean demand $\lambda_{ij}$ at that point in time. A mean demand matrix $\lambda$ is a matrix of mean demands $\lambda_{ij}$.

Distribution Policy

A distribution policy is the delivered quantities of each $i^{th}$ consumer item where i=1, 2, ..., m at each $j^{th}$ location where j=1, 2, ..., n of a single period inventory system in accordance with a predetermined business strategy.

Draw $D_{ij}$, and draw matrix D

Draw $D_{ij}$ is an industry term referring to the delivered quantity of an $i^{th}$ consumer item to a $j^{th}$ location of a single period inventory system. A draw matrix D is a matrix of draws $D_{ij}$.

Returns $R(\lambda_{ij},D_{ij})$, Total Expected Returns $Er(\lambda,D)$, and Expected Returns Percentage % Er Returns $R(\lambda_{ij},D_{ij})$ is an industry term referring to the number of unsold items of an $i^{th}$ consumer item at a $j^{th}$ location of a single period inventory system, and is given by $R(\lambda_{ij},D_{ij})=\max(D_{ij}-X_{ij},0)$ where $D_{ij}$, $X_{ij}$, and $\lambda_{ij}$ are the $i^{th}$ consumer item's draw, demand and mean demand, respectively, at the $j^{th}$ location. The total expected returns ER at all n locations of a single period inventory system is given by $ER(\lambda,D)=\Sigma\Sigma ER(\lambda_{ij},D_{ij})$ where $ER(\lambda_{ij},D_{ij})$ is the expected value of $R(\lambda_{ij},D_{ij})$. The expected returns percentage % ER of a distribution policy for a single period inventory system is given by % $ER(\lambda,D)=100ER(\lambda,D)/\Sigma\Sigma D_{ij}=100-\%\ ES(\lambda,D)$.

Safety Stock $SS_i$ and Total Safety Stock Q

For the purpose of the present invention, safety stock $SS_i$ refers to the difference between an actual draw of an $i^{th}$ consumer item at a $j^{th}$ location of a single period inventory system and its demand forecast at that location, namely, $SS_{ij}=D_{ij}-\lambda_{ij}$, and therefore can assume positive or negative values. This is in contradistinction to the traditional industry definition of safety stock, namely, $SS_{ij}=\max\{0, D_{ij}-\lambda_{ij}\}$. The total safety stock Q of all m consumer items at all n locations of a single period inventory system is given by $Q=\Sigma\Sigma SS_{ij}$.

Sales $S(\lambda_{ij},D_{ij})$, Total Expected Sales $ES(\lambda,D)$, and Expected Sales Percentage % ES Sales $S(\lambda_{ij},D_{ij})$ refers to the number of sold items of an $i^{th}$ consumer item at a $j^{th}$ location of a single period inventory system as upper bounded by the draw $D_{ij}$ at that location for that consumer item at each point in time, and is given by $S(\lambda_{ij},D_{ij})=\min(D_{ij},X_{ij})=D_{ij}-R(\lambda_{ij},D_{ij})$ where $D_{ij}$, $X_{ij}$, and $\lambda_{ij}$ are the $i^{th}$ consumer item's draw, demand, and mean demand, respectively, at the $j^{th}$ location. The total expected sales $ES(\lambda,D)$ of all m consumer items at all n locations of a single period inventory system is given by $ES(\lambda,D)=\Sigma\Sigma ES(\lambda_{ij},D_{ij})$ where $ES(\lambda_{ij},D_{ij})$ is the expected value of $S(\lambda_{ij},D_{ij})$. The expected sales percentage % ES of a distribution policy for a single period inventory system is given by % $ES(\lambda,D)=100ES(\lambda,D)/\Sigma\Sigma D_{ij}=100-\%\ ER(\lambda,D)$.

Sellout $SO(\lambda,D_{ij})$, Expected Number of Sellouts $ESO(\lambda_{ij},D_{ij})$, Total Expected Number of Sellouts $ESO(\lambda,D)$, and Expected Sellout Percentage % ESO Sellout $SO(\lambda_{ij},D_{ij})$ is an industry term referring to an occurrence of demand being greater than a delivered quantity of an $i^{th}$ consumer item at a $j^{th}$ location of a single period inventory system, namely, $SO(\lambda_{ij},D_{ij})=\delta(D_{ij}<X_{ij})$ where $\delta$ is a binary indicator function:

$$\delta(\text{condition}) = \begin{cases} 1, & \text{if condition is true} \\ 0, & \text{else} \end{cases}$$

where $D_{ij}$, $X_{ij}$, and are the $i^{th}$ consumer item's draw, demand, and mean demand, respectively, at that the $j^{th}$ location. The expected number of sellouts $ESO(\lambda_{ij},D_{ij})$ for an $i^{th}$ consumer item at a $j^{th}$ location of a single period inventory system is given by $ESO(\lambda_{ij},D_{ij})=P(X_{ij}>D_{ij})=1-F(\lambda_{ij},D_{ij})$. The total expected number of sellouts of all m consumer items at all n locations of a single period inventory system is given by $ESO(\lambda,D)=\Sigma\Sigma ESO(\lambda_{ij},D_{ij})=mn-\Sigma\Sigma F(\lambda_{ij},D_{ij})$. The expected sellout percentage (% ESO) of a distribution policy for a single period inventory system is given by % $ESO(\lambda,D)=100ESO(\lambda,D)/mn=100-\%\ SA$.

Single Period Inventory Systems

Single period inventory systems are largely concerned with consumer items having a limited shelf life at the end of which an item loses most, if not all, of its consumer value, and the stock of which is not replenished to prevent an occurrence of a sellout. Such consumer items can include perishable goods, for example, fruit, vegetables, flowers, and the like, and fixed lifetime goods, for example, printed media publications, namely, daily newspapers, weeklies, monthlies, and the like. Two common problems of single period inventory systems are known in the industry as the so-called "newsvendor" problem, i.e., the sale of the same item throughout a multi-location single period inventory system and the so-called "knapsack" problem, i.e., the sale of different items at the same location.

Stockout $ST(\lambda_{ij},D_{ij})$, Expected Stockout $EST(\lambda,D)$, Total Expected Stockout $EST(\lambda,D)$, and Expected Stockout Percentage % EST Stockout $ST(\lambda_{ij},D_{ij})$ is the quantity of unsatisfied demand for an $i^{th}$ consumer item at a $j^{th}$ location of a single period inventory system, and is given by $ST(\lambda_{ij},D_{ij})=\max(X_{ij}-D_{ij},0)=X_{ij}-S(\lambda_{ij},D_{ij})$ where $D_{ij}$, $X_{ij}$ and $\lambda_{ij}$ are the $i^{th}$ consumer item's draw, demand, and mean demand, respectively, at the $j^{th}$ location. The total expected stockout $EST(\lambda,D)$ of all m consumer items at all n locations of a single period inventory system is given by $EST(\lambda,D)=\Sigma\Sigma EST(\lambda_{ij},D_{ij})$ where $EST(\lambda_{ij},D_{ij})$ is the expected value of $ST(\lambda_{ij},D_{ij})$. The expected stockout percentage % EST for a distribution policy is given by % $EST(\lambda,D)=100EST(\lambda,D)/\Sigma\Sigma D_{ij}$.

BACKGROUND

One computer implemented approach for calculating a demand forecast involves defining a so-called demand forecast tree capable of being graphically represented by a single top level node with at least two branches directly emanating therefrom, each branch having at least one further node. The demand forecast is computed on the basis of historical sales data typically associated with bottom level nodes of a demand forecast tree by a forecast engine capable of determining a mathematical simulation model for a demand process. One such forecast engine employing statistical seasonal causal time series models of count data is commercially available from Demantra Ltd, Israel, under the name Demantra™ Demand Planner.

One exemplary demand forecast application is the media distribution problem, namely, determining the number of copies of different daily newspapers to be delivered daily to different locations to minimize two mutually conflicting indices commonly quantified for evaluating the efficacy of a distribution policy for a newspaper: the frequency of sellouts, and the number of returns both typically expressed in percentage terms. It is common practice in the industry that a draw for a newspaper at a location for a given day is greater than its demand forecast at that location for that day so as to reduce the probability of a sellout but with the inherent penalty that returns will be greater. In the case of distribution policies for newspapers, safety stocks are allocated to locations to ensure a predetermined availability level for a given demand probability function to achieve a reasonable balance between expected returns and expected occurrences of sellouts. Moreover, it is common practice that locations are sorted into one of several classes depending on the average number of copies sold, each class being assigned a different availability level, say, 70%, 80%, and the like.

BRIEF SUMMARY

Broadly speaking, the present invention provides a novel computer implemented system for determining a distribution policy for a single period inventory system on the basis of performance metrics, for example, returns, sellout, and stockout other than the hitherto employed availability metric. In contradistinction to prevailing distribution policy practice which effectively regards each location of a single period inventory system as an isolated entity, the present invention is based on the notion that a distribution policy should allocate draw units on the basis of relative merit in accordance with an allocation decision criterion subject to one or more constraints rather than in some arbitrary absolute fashion. The choice of the most appropriate allocation decision criterion coupled with one or more constraints for a single period inventory system is highly dependent on characteristics of the single period inventory system in question, for example, the frequency distribution of the mean demands at its nodes, amongst others, and a business objective.

The preferred allocation decision criteria of the present invention can be divided into two groups as follows:

Group I consists of simple allocation decision criteria, including inter alia:

(i) maximum incremental availability $\max_{i,j} \{F(\lambda_{ij},D_{ij}+1)-F(\lambda_{ij},D_{ij})\}$;

(ii) minimum availability $\min_{i,j} \{F(\lambda_{ij},D_{ij})\}$;

(iii) minimum incremental expected return $\min_{i,j}\{ER(\lambda_{ij},D_{ij}+1)-ER(\lambda_{ij},D_{ij})\}$; and (iv) maximum decremental expected stockout $\max_{i,j} \{EST(\lambda_{ij},D_{ij})-EST(\lambda_{ij},D_{ij}+1)\}$;

each being subject to one or more of the following constraints $\Sigma\Sigma SS_{ij}<Q$ where Q is the total safety stock threshold for delivery of all m consumer items to all n locations, $\Sigma_j SS_{ij}<q_1^i$ where $q_1^i$ is the safety stock of the $i^{th}$ consumer item at all locations, $\Sigma_i SS_{ij}<q_2^j$ where $q_2^j$ is the safety stock of all the consumer items at a $j^{th}$ location, % $EST(\lambda,D)\leq s$ where s is a predetermined expected stockout percentage threshold, % $ER(\lambda,D)\leq r$ where r is a predetermined expected return percentage threshold, % $ESO(\lambda,D)\leq e$ where e is a predetermined expected sellout percentage threshold, $a_{ij}\leq D_{ij}\leq b_{ij}$ where $a_{ij}$ and $b_{ij}$ are respectively lower and upper boundaries for a draw of an $i^{th}$ consumer item at a $j^{th}$ location of a single period inventory system; $A\leq\Sigma\Sigma D_{ij}\leq B$ where A and B are respectively lower and upper boundaries for the draw of all m consumer items at all n locations of a single period inventory system, $A_1^j\leq\Sigma_i D_{ij}\leq B_1^j$ where $A_1^j$ and $B_1^j$ are respectively lower and upper boundaries for the draw of all m consumer items at a $j^{th}$ location of a single period inventory system, and $A_1^i\leq\Sigma_j D_{ij}\leq B_1^i$ where $A_1^i$ and $B_1^i$ are respectively lower and upper boundaries for the draw of a $i^{th}$ consumer items at all n locations of a single period inventory system.

Group II consists of weighted composite allocation decision criteria each having two components oppositely acting upon the draw matrix D required to yield a predetermined business objective expressed in terms of an expected returns percentage (% ER) or an expected percentage of a parameter associated with occurrences of sellouts of all m consumer items at all n locations of a single period inventory system. The parameter associated with occurrences of sellouts may be either the number of sellouts of all m consumer items at all n locations of a single period inventory system in which case the allocation decision criterion is as follows:

$$w_1(\% ER(\lambda,D)-\% ER(\lambda,D^0)+w_2(\% ESO(\lambda,D^0)-\% ESO(\lambda,D)) \text{ or} \qquad (v)$$

the number of stockouts at all n locations of a single period inventory system in which case the allocation decision criterion is as follows:

$$w_1(\% \, ER(\lambda,D) - \% \, ER(\lambda,D^0) + w_2(\% \, EST(\lambda,D^0) - \% \, EST(\lambda,D)) \quad \text{(vi)}$$

where $w_1$ and $w_2$ are weights, and $D^0$ is an initial draw matrix. The weighted composite allocation decision criteria can be subject to one or more of the above mentioned constraints, and also $\% \, ER(\lambda,D) = \% \, ESO(\lambda,D)$ in the case of criterion (v), and also $\% \, ER(\lambda,D) = \% \, EST(\lambda,D)$ in the case of criterion (vi). Typically $D^0 = \lambda$. In point of fact, the latter criterion is conceptually more valid than the former criterion since the two parameters "returns" and "stockouts" have the same dimensions, namely, units of consumer items, which is not the dimension of sellouts. But this notwithstanding, it is envisaged that the former sellout criterion will gain more acceptance than the latter stockout criterion since expected sellout percentages rather than expected stockout percentages are more traditional in the art of single period inventory systems.

To reach an optimal allocation of draw units, the simplest approach is to allocate additional draw units one by one starting from an initial draw allocation, say, equal to the mean demand matrix. But in the case of allocating a predetermined total draw quantity $\Sigma\Sigma D_{ij}$ or total predetermined safety stock quantity Q, it may be allocated with less iterations if it is initially allocated between the locations of a single period inventory system, say, in accordance with a predetermined availability at each location, and thereafter the initial draw allocation is fine-tuned to optimal allocations at each location in accordance with a selected allocation decision criterion by so-called pairwise switching.

In connection with the weighted composite allocation decision criteria (v) and (vi), the present invention also provides a computer implemented Decision Support Tool for graphically displaying the expected returns percentages % ER for a multitude of expected returns percentages against their corresponding minimal expected sellout percentages % ESO, or vice versa. Alternatively, the Decision Support Tool can preferably graphically display expected returns percentages % ER for a multitude of expected returns percentages against their corresponding minimal expected stockout percentages % EST, or vice versa.

BRIEF DESCRIPTION OF THE DRAWINGS

In order to better understand the invention and to see how it can be carried out in practice, preferred embodiments will now be described, by way of non-limiting examples only, with reference to the accompanying drawings in which.

DETAILED DESCRIPTION OF PREFERRED EMBODIMENTS

Figure 1:
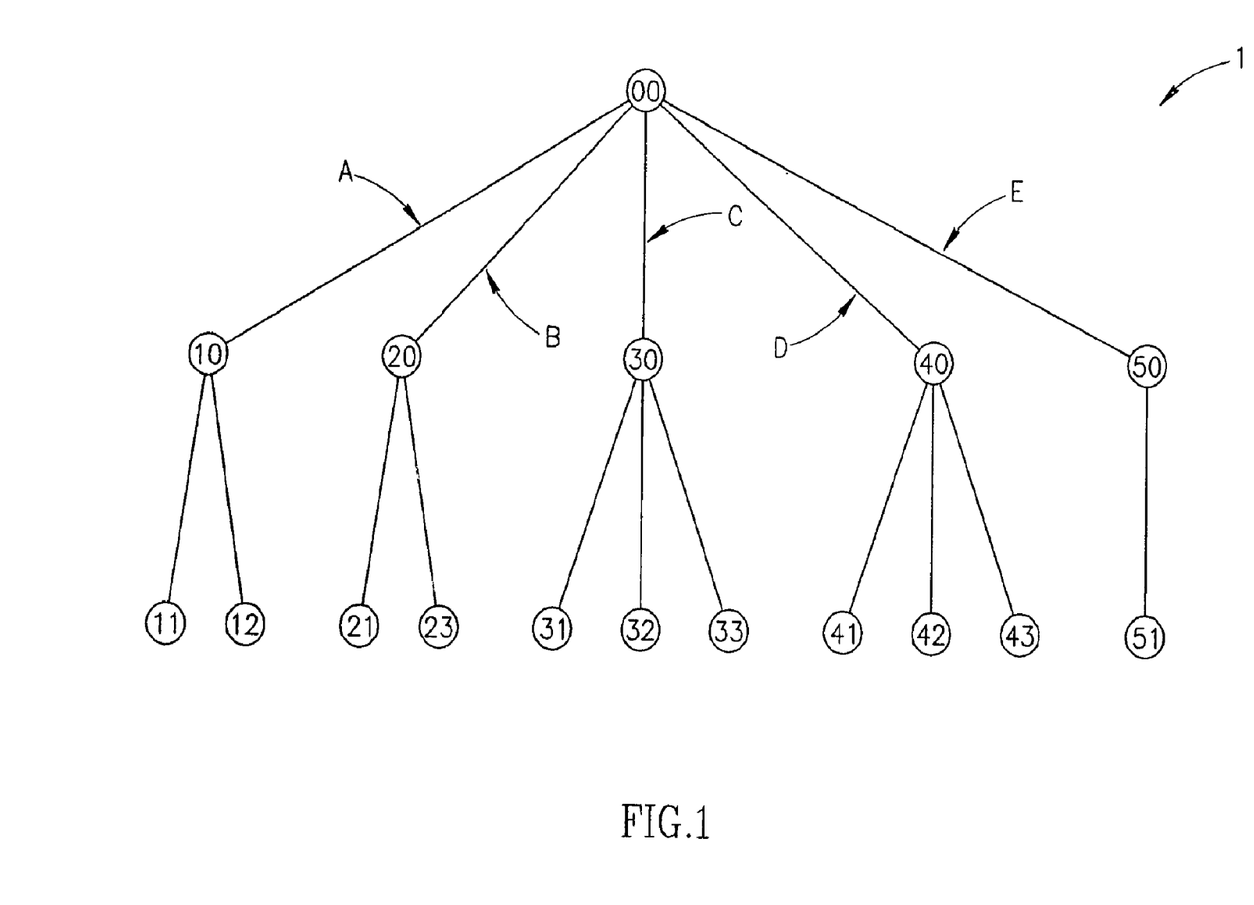
FIG. 1 is a pictorial representation showing a demand forecast tree for computing demand forecast information for five different perishable consumer items.
Figure 2:
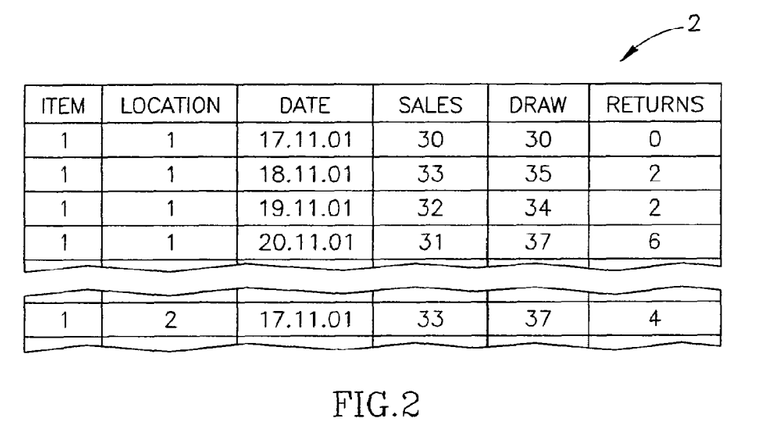
FIG. 2 is a table showing historical sales data associated with the demand forecast tree of FIG. 1.

FIG. 1 shows an exemplary demand forecast tree 1 having a single top level node (00) with five branches A, B, C, D and E for correspondingly representing the sale of Item I (top level-1 node (10)) at Locations 1 and 2 (bottom level nodes (11) and (21)), Item II (top level-1 node (20)) at Locations 1 and 3 (bottom level nodes (21) and (23)), Item III (top level-1 node (30)) at Locations 1, 2 and 3 (bottom level nodes (31), (32) and (33)), Item IV (top level-1 node (40)) also at Locations 1, 2 and 3 (bottom level nodes (41), (42) and (43)); and Item V (top level-1 node (50)) at Location 1 (bottom level node (51)) only. FIG. 2 shows an exemplary table 2 containing historical sales data for Item I at the bottom level nodes (11) and (12). Similar tables exist for the sale of the other items at their respective locations.

Figure 3:
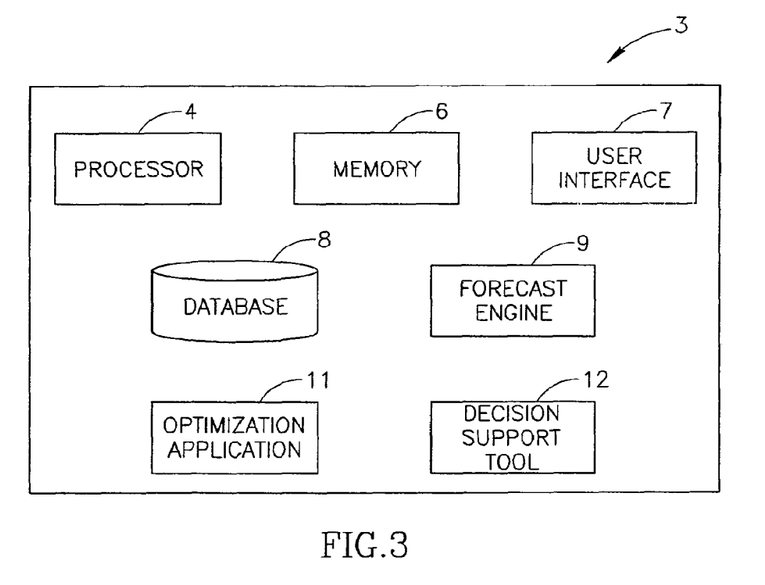
FIG. 3 is a block diagram of a computer implemented system for determining a distribution policy for a single period inventory system, and including a Decision Support Tool for facilitating user determination of a distribution policy for a single period inventory system.

FIG. 3 shows a computer implemented system 3 with a processor 4, memory 6, a user interface 7, including suitable input devices, for example, a keypad, a mouse, and the like, and output means, for example, a screen, a printer, and the like, with other computer components for enabling operation of the system including result analysis. The computer implemented system 3 includes a database 8 for storing historical time series of sales information of items at locations, a forecast engine 9 for forecasting the mean demand $\lambda_i$ for each $i^{th}$ perishable consumer item at each $j^{th}$ location on the basis of the historical sales data, and an optimization application 11 for determining the distribution policy for a single period inventory system subject to one or more constraints. The computer implemented system 3 also includes a Decision Support Tool (DST) 12 for facilitating user determination of a distribution policy for a single period inventory system. The computer implemented system 3 may be implemented as illustrated and described in commonly assigned U.S. patent application Ser. No. 10/058,830 entitled "*Computer Imple-* mented Method and System for Demand Forecast Applications*", the contents of which are incorporated herein by reference. Whilst the present invention is being described in the context of a fully functional computer implemented system, it is capable of being distributed in as a program product in a variety of forms, and the present invention applies equally regardless of the particular type of signal bearing media used to carry out distribution. Examples of such media include recordable type media, e.g., CD-ROM and transmission type media, e.g., digital communication links.

Figure 4:
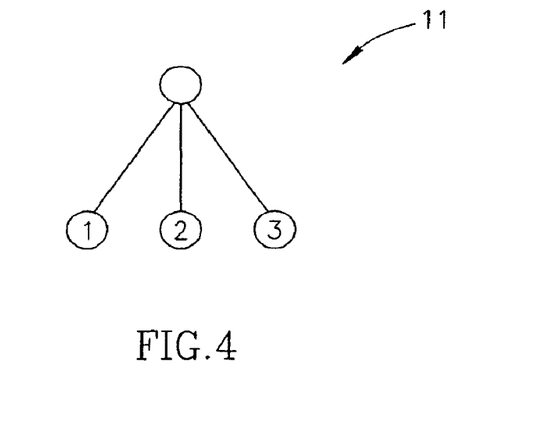
FIG. 4 is a pictorial representation of a simple single period inventory system having three locations for draw allocation in accordance with the present invention.
Figure 5:
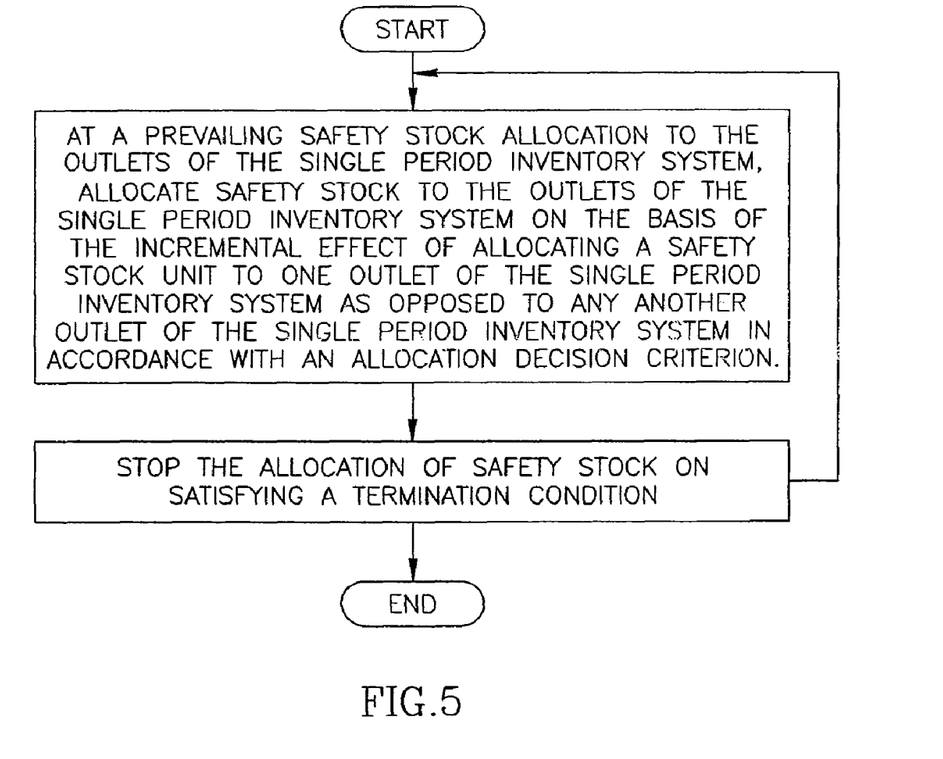
FIG. 5 is a flow chart of a method for determining a distribution policy for a single period inventory system in accordance with the present invention.
Figure 6:
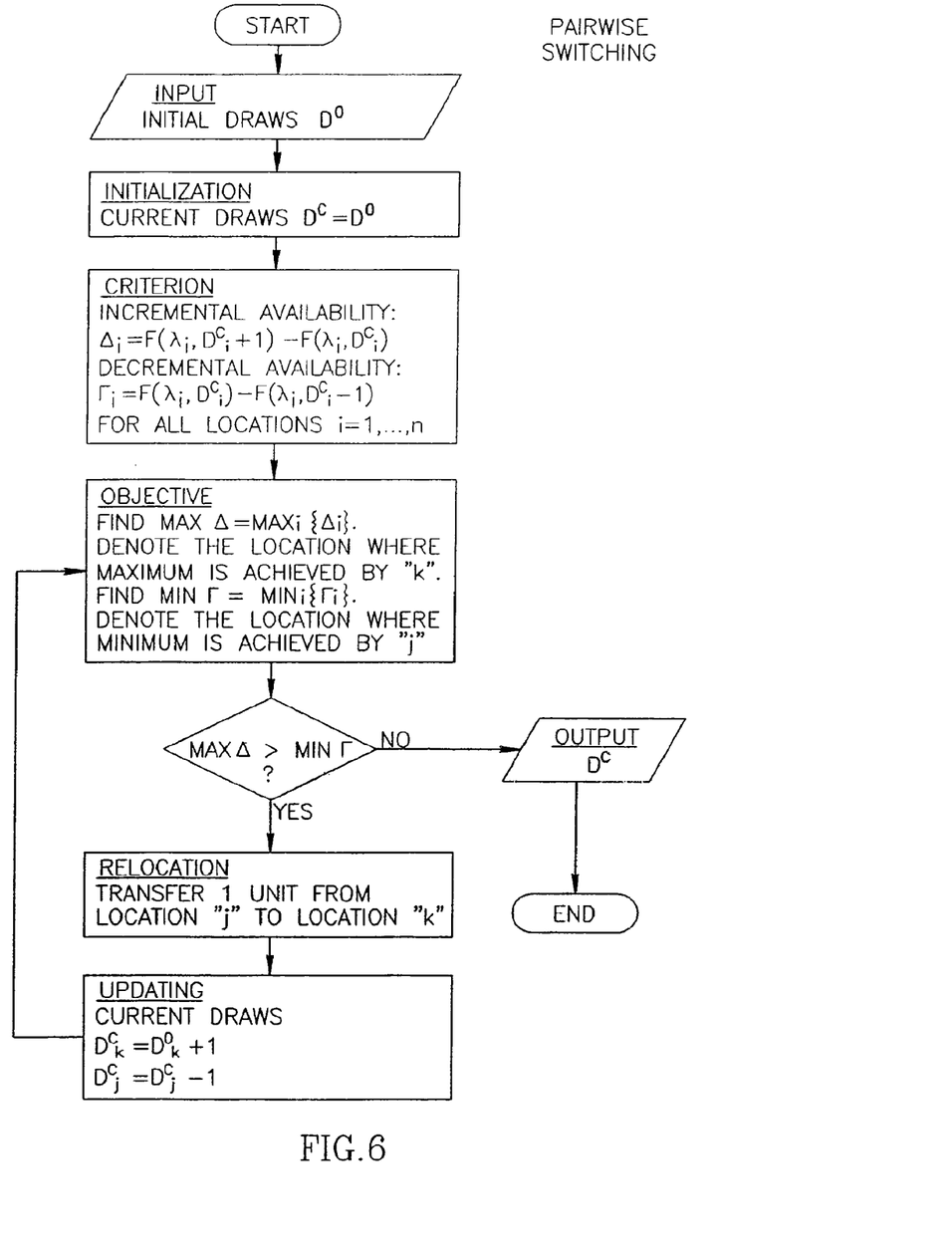
FIG. 6 is a flow chart showing the steps of a method for re-allocating a predetermined draw to the locations of a single period inventory system based on maximal incremental availability in accordance with a first preferred embodiment of the method of FIG. 5.

The present invention will now be exemplified for an exemplary "newsvendor" problem for determining the distribution policy for a single period inventory system 13 for delivering a single newspaper title between three locations, namely, j=1, 2 and 3 (see FIG. 4). For the sake of the example below, demand at Locations 1, 2 and 3 are assumed to have a Poisson probability distribution, and the single period inventory system has a mean demand vector $\lambda=(10, 40, 100)$ but the present invention can be equally applied to other probability distributions of demand. Based on this assumption, the expressions for calculating expected return (ER) and expected stockout (EST) for Locations 1, 2, and 3 are as follows:

$$ER(\lambda_j, D_j) = f(\lambda_j, D_j - 1) + (D_j - \lambda_j) F(\lambda_j, D_j - 2)$$

$$EST(\lambda_j, D_j) = f(\lambda_j, D_j) + (\lambda_j - D_j)(1 - F(\lambda_j, D_j - 1))$$

where $f(\bullet)$ is the Poisson probability distribution function (pdf) and $F(\bullet)$ is the Poisson cumulative probability distribution function (cdf) for the demand for the consumer item at the $j^{th}$ location, and $\lambda_j$ and $D_j$ are respectively the mean demand value and the draw at that location.

The use of the present invention for determining the distribution policy for the single period inventory system 13 is now described with reference to FIGS. 6-9 in connection with the first simple allocation decision criterion, namely, maximum incremental availability as given by $\max_j \{F(\lambda_j, D_j+1) - F(\lambda_j, D_j)\}$ subject to one or more of the following constraints: $\Sigma SS_j \leq Q$, % $ER(\lambda, D) \leq r$; % $ESO(\lambda, D) \leq e$; % $EST(\lambda, D) \leq s$; $a_j \leq D_j < b_j$; and $A \leq \Sigma D_j \leq B$. The use of the present invention as exemplified in FIGS. 6-10 can be equally extended to the other simple allocation decision criterion (ii) to (iv) by substitution of their corresponding expressions into the blocks entitled Criterion and Objective in the flow diagrams of FIGS. 6 and 8.

Figure 7:
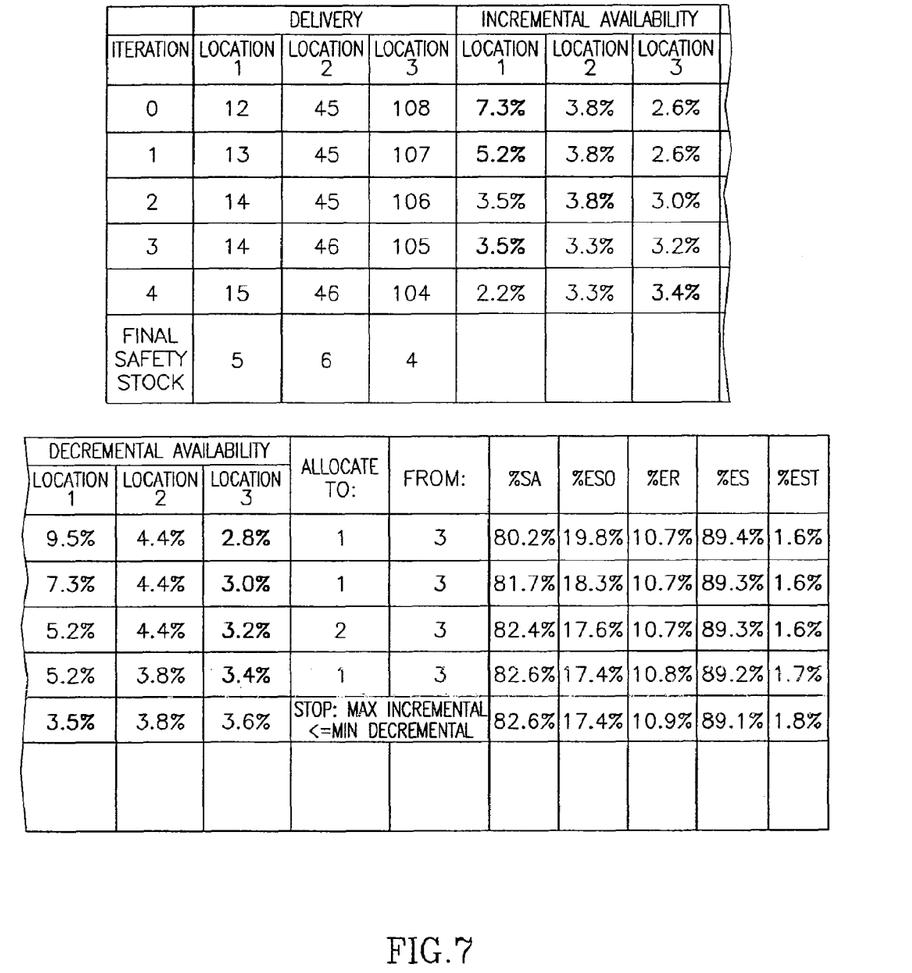
FIG. 7 is a table summarizing the results of the iterations for re-allocating the combined total draw of the demand forecast and 15 safety stock units between the locations of the single period inventory system of FIG. 4 in accordance with the method of FIG. 6.
Figure 8:
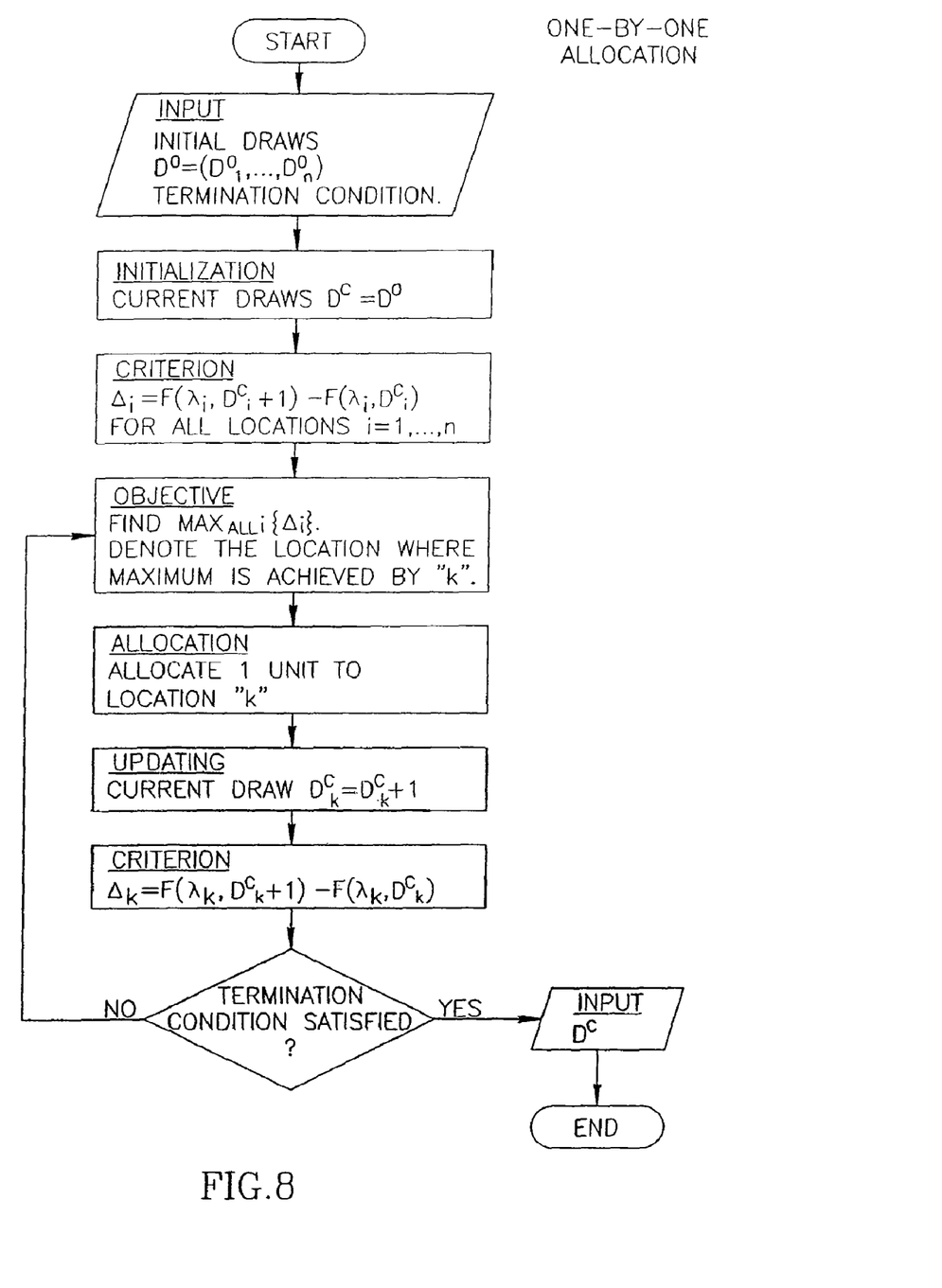
FIG. 8 is a flow chart similar to the flow chart of FIG. 6 but for the one-by-one allocation of a predetermined draw to the locations of a single period inventory system in accordance with a second preferred embodiment of the method of FIG. 5.

To better exemplify the potential of the present invention for more advantageously allocating draw, the following performance metrics % SA, % ESO, % ER, % ES, and % EST are employed for comparing the allocation of the same safety stock quantity in accordance with the conventional approach of the same availability at each location and maximum incremental availability. In accordance with a conventional 80% availability at each location, this imposes a safety stock allocation of 2, 5 and 8 units to Locations 1, 2 and 3, respectively, which yields the following results: % SA=80.2%, % ESO=19.8%, % ER=10.7%, % ES=89.3%, and % EST=1.6%. FIG. 7 shows how the same safety stock allocation of Q=15 units using pairwise switching can arrive at a safety stock allocation of 5, 6 and 4 units to Locations 1, 2 and 3, respectively, which yields the following results: % SA=82.6%, % ESO=17.4%, % ER=10.9%, % ES=89.1%, and % EST=1.8%, namely, a dramatically increased % SA from 80.2% to 82.6% whilst paying only marginal penalties in terms of increased expected returns percentage (% ER) from 10.7% to 10.9% and increased expected stockout percentage (% EST) from 1.6% to 1.8%. The results exemplify that since locations with different mean demands contribute differently to overall system availability % SA, this performance metric can be improved substantially by allocating draw units to the locations which contribute most at a prevailing draw allocation $D^c$ at the expense of other locations. In the present case, the initial safety stock allocation of providing an about 80% availability at each of the Locations 1, 2 and 3 is morphed to availabilities of 95%, 85%, and 68%, respectively.

Figure 9:
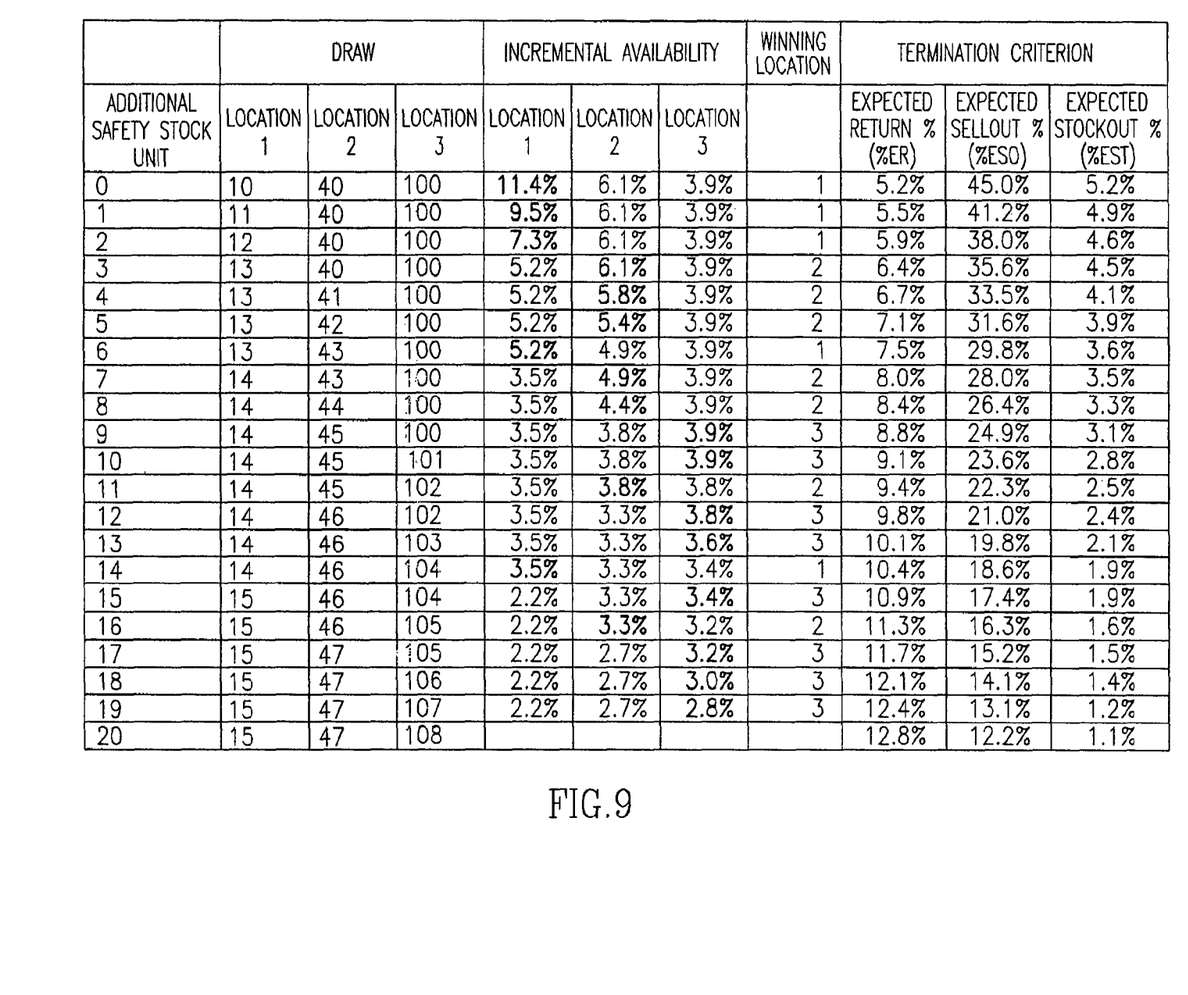
FIG. 9 is a table similar to the table of FIG. 7 except in accordance with the method of FIG. 8 for the one-by-one allocation of up to 20 safety stock units.

As mentioned earlier, pairwise switching can only be employed in the case of re-allocation of a predetermined draw. The table of FIG. 9 shows the incremental effect of one-by-one allocation of safety stock units to the Locations 1, 2 and 3, the column entitled "winning location" indicating which Location 1, 2 or 3 receives the next additional safety stock unit on the basis of its incremental availability being the greatest at any given prevailing draw allocation $D^c$. The table of FIG. 9 enables determining the results of the performance metrics % SA, % ESO, % ER, % ES, and % EST for termination conditions other than a predetermined safety stock quantity, say, % $ESO \leq 15\%$ which in this case imposes a safety stock allocation of 5, 7 and 6 units to the Locations 1, 2 and 3, respectively, which yields % SA=75.9%, % ESO=14.1%, % ER=12.1%, % ES=87.9%, and % EST=1.4%.

Figure 10:
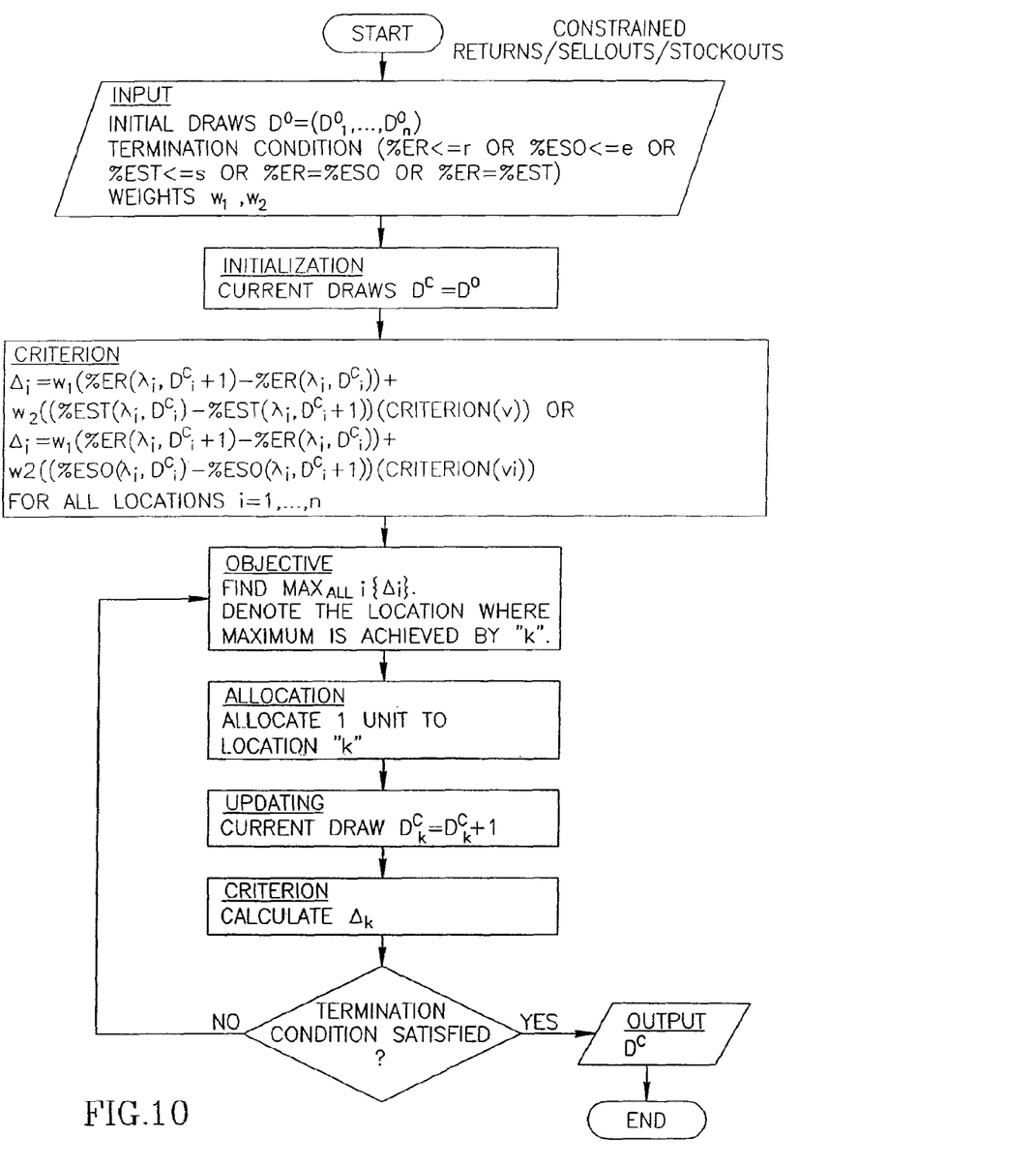
FIG. 10 is a flow chart showing the steps of a method in accordance with the present invention for determining a distribution policy for a single period inventory system using a weighted composite allocation decision criterion.
Figure 11:
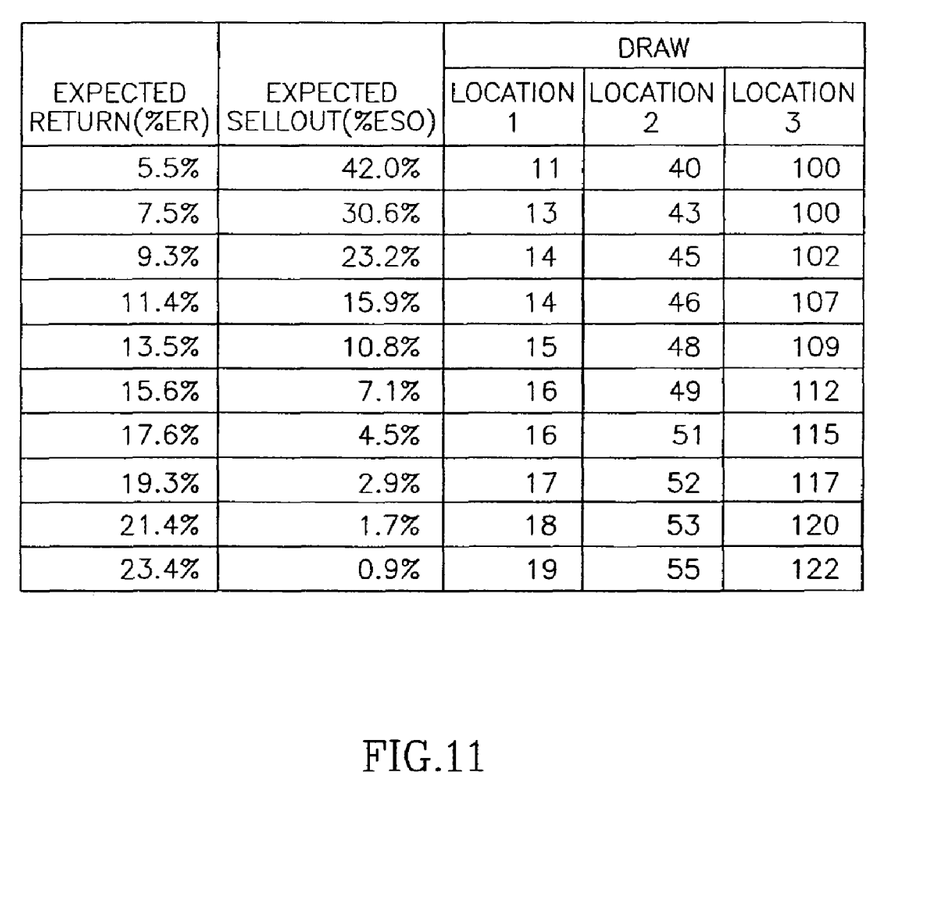
FIG. 11 is a table summarizing the minimal expected sellout percentages (% ESO) for a multitude of expected returns percentages (% ER) for allocating draw units to the locations of the single period inventory system of FIG. 4 in accordance with the method of FIG. 10 together with their corresponding draw vectors D.
Figure 12:
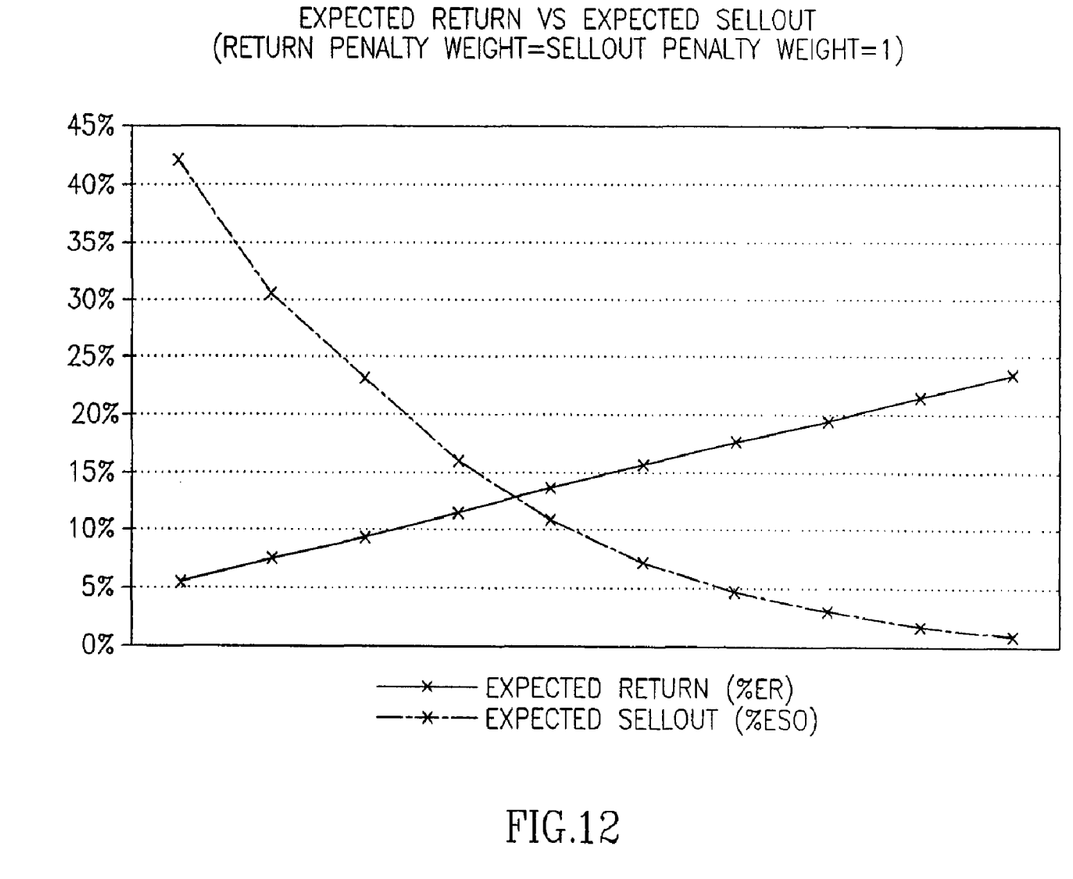
FIG. 12 is a graph showing the results of the table of FIG. 11 for facilitating user determination of the distribution policy for a single period inventory system.

The use of the present invention for allocating draw to the Locations 1, 2 and 3 is now described with reference to FIGS. 10-12 in connection with the first weighted composite allocation decision criterion, namely, $w_1(\% ER(\lambda, D) - \% ER(\lambda, D^0)) + w_2(\% ESO(\lambda, D^0) - \% ESO(\lambda, D))$ subject to one or more of the following constraints: $\Sigma SS_j \leq Q$, % $ER(\lambda, D) \leq r$; % $ESO(\lambda, D) \leq e$; % $EST(\lambda, D) \leq s$; $a_j \leq D_j < b_j$; and $A < \Sigma D_j \leq B$. FIG. 11 shows the results for repetitions of the method set out in the flow diagram of FIG. 10 for different expected returns percentage constraints % $ER(\lambda, D) \leq r$ at intervals of about 2% to calculate their corresponding minimal expected sellout percentages % ESO. The DST 12 graphically shows these results (see FIG. 12) for enabling a user to select a draw vector D, thereby determining the draw allocation between the Locations 1, 2 and 3. This approach can be repeated for a multitude of different expected sellout percentage constraints % ESO $(\lambda, D) < e$, say, at intervals of 5%. Also, this approach may be repeated using the second weighted composite allocation decision criterion based on stockouts rather than sellouts.

While the invention has been described with respect to a limited number of embodiments, it will be appreciated that many variations, modifications, and other applications of the invention can be made within the scope of the appended claims.

What is claimed is:

1. An optimization application for determining a distribution policy for a single period inventory system comprising a plurality of locations, the optimization application operating on a computer system comprising of at least a processor and a memory, the optimization application operable to:
    allocate draw units of a consumer item to each location of the plurality of locations;
    determine a location from the plurality of locations such that the determined location meets a pre-selected allocation decision criterion based on at least the draw units allocated to each location of the plurality of locations;
    allocate one and only one additional draw unit of the consumer item to the determined location; and
    repeat the determine the location step and the allocate the one and only one additional draw unit step until at least one constraint is satisfied.

2. The optimization application of claim 1 wherein the pre-selected allocation decision criterion is a maximum incremental availability, where availability is a probability of completely satisfying a demand for the consumer item at the location without occurrence of a sellout due to an insufficient draw at the location and is computed using a cumulative distribution function (cdf) of a mean demand and draw units of the consumer item allocated for the location, wherein incremental availability for the location is a difference between a first availability of the consumer item at the location and a second availability of the consumer item at the location, the second availability computed with one additional draw unit of the consumer item allocated to the location in comparison to the draw units allocated for computation of the first availability and the maximum incremental availability is a maximum of the incremental availability of the consumer item computed for each location of the plurality of locations, and wherein the determined location has the maximum incremental availability.

3. The optimization application of claim 1 wherein the pre-selected allocation decision criterion is a minimum availability, where availability is a probability of completely satisfying a demand for the consumer item at the location without occurrence of a sellout due to insufficient draw at the location and is computed using a cumulative distribution function (cdf) of the mean demand and draw units of the consumer item allocated for the location, where minimum availability is a minimum of the availability of the consumer item computed for each location of the plurality of locations and wherein the determined location has the minimum availability.

4. The optimization application of claim 1 wherein the pre-selected allocation decision criterion is a maximum decremental expected stockout, where expected stockout is expected quantity of unsatisfied demand of the consumer item at the location and is computed using demand, mean demand and draw units of the consumer item allocated for the location wherein, the decremental expected stockout is a difference between a first expected stockout and a second expected stockout, the first expected stockout computed for one additional draw unit of the consumer item allocated at the location in comparison to the draw units allocated for computation of the second expected stockout, where the maximum decremental expected stockout is a maximum of the decremental expected stockout of the consumer item computed for each location and wherein the determined location has the maximum decremental expected return.

5. The optimization application of claim 1 wherein the pre-selected allocation decision criterion is a sum of two weighted components, a first weighted component based on a difference between two expected return percentages with at least one expected return percentage calculated based on an initial allocation of the draw units and a second weighted component based on a difference between two expected sellout percentages with at least one expected sellout percentage calculated based on the initial allocation of the draw units.

6. The optimization application of claim 1 wherein the pre-selected allocation decision criterion is a sum of two weighted components, a first weighted component based on a difference between two expected return percentages with at least one expected return percentage calculated based on an initial allocation of the draw units and a second weighted component based on a difference between two expected stockout percentages with at least one expected stockout percentages calculated based on the initial allocation of the draw units.

7. The optimization application of claim 1 wherein the pre-selected allocation decision criterion comprises a maximum incremental availability criterion and a minimum decremental availability criterion and the determine the location step determines a first location that has a maximum incremental availability and a second location that has a minimum decremental availability and wherein the allocate the one and only one additional draw unit step allocates the one and only one additional draw unit from the second location to the first location.

8. The optimization application of claim 1 further comprising a forecast engine for forecasting the mean demand of the consumer item at each location of the plurality of locations.

9. The optimization application of claim 8 wherein the allocate the draw units of the consumer item to each location allocates draw units equal to the mean demand of the consumer item at that location.

10. The optimization application of claim 1 wherein the at least one constraint is based on performance metrics including at least one of safety stock, expected sellout, expected stockout, or expected return.

11. The optimization application of claim 10 wherein, the safety stock is a difference between an actual draw of the consumer item at the location and its demand forecast at that location and can assume one of positive, or negative value and wherein the optimization application is further operable to compute the draw units of the consumer item to be allocated to each location even when the safety stock assumes a negative value.

12. The optimization application of claim 1 wherein the consumer item is a printed media publication.

13. A computer implemented method for determining a distribution policy for a single period inventory system comprising a plurality of locations, the method comprising the steps of:

allocating draw units of a consumer item to each location of the plurality of locations;

determining, using at least one processor operatively coupled with a memory, a location from the plurality of locations such that the determined location meets a pre-selected allocation decision criterion based on at least the draw units allocated to each location of the plurality of locations;

allocating one and only one additional draw unit of the consumer item to the determined location; and repeating the determining the location step and the allocating the one and only one additional draw unit step until at least one constraint is satisfied.

14. The computer implemented method of claim 13 wherein the pre-selected allocation decision criterion is a maximum incremental availability, where availability is a probability of completely satisfying a demand for the consumer item at the location without occurrence of a sellout due to an insufficient draw at the location and is computed using a cumulative distribution function (cdf) of a mean demand and draw units of the consumer item allocated for the location, wherein incremental availability for the location is a difference between a first availability of the consumer item at the location and a second availability of the consumer item at the location, the second availability computed with one additional draw unit of the consumer item allocated to the location in comparison to the draw units allocated for computation of the first availability and the maximum incremental availability is a maximum of the incremental availability of the consumer item computed for each location of the plurality of locations, and wherein the determining the location step determines a location that has the maximum incremental availability.

15. The computer implemented method of claim 14 wherein the pre-selected allocation decision criterion is a minimum availability, where availability is a probability of completely satisfying a demand for the consumer item at the location without occurrence of a sellout due to insufficient draw at the location and is computed using a cumulative distribution function (cdf) of the mean demand and draw units of the consumer item allocated for the location, where minimum availability is a minimum of the availability of the consumer item computed for each location of the plurality of locations and wherein the determining the location step determines a location with the minimum availability.

16. The computer implemented method of claim 13 wherein the pre-selected allocation decision criterion is a minimum incremental expected return, where expected return is expected number of the consumer item unsold at the location and is computed using demand, mean demand and draw units of the consumer item allocated for the location wherein,
the incremental expected return is a difference between a first expected return and a second expected return, the second expected return computed for one additional draw unit of the consumer item allocated at the location in comparison to the draw units allocated for computation of the first expected return, where the minimum incremental expected return is a minimum of the incremental expected return of the consumer item computed for each location and wherein the determined location has the minimum incremental expected return.

17. The computer implemented method of claim 13 wherein the at least one constraint is based on performance metrics including at least one of safety stock, expected sellout, expected stockout, or expected return.

18. A machine readable storage medium storing a plurality of instructions execution of which by a processor causes the processor to determine a distribution policy for a single period inventory system comprising a plurality of locations, the execution of the plurality of instructions by the processor causing the processor to perform the actions of:

allocating draw units of a consumer item to each location of the plurality of locations;
determining a location from the plurality of locations such that the determined location meets a pre-selected allocation decision criterion based on at least the draw units allocated to each location of the plurality of locations;
allocating one and only one additional draw unit of the consumer item to the determined location; and
repeating the determining the location step and the allocating the one and only one additional draw unit step until at least one constraint is satisfied.

19. The machine readable storage medium of claim 18 wherein the pre-selected allocation decision criterion is a maximum incremental availability, where availability is a probability of completely satisfying a demand for the consumer item at the location without occurrence of a sellout due to an insufficient draw at the location and is computed using a cumulative distribution function (cdf) of a mean demand and draw units of the consumer item allocated for the location, wherein
incremental availability for the location is a difference between a first availability of the consumer item at the location and a second availability of the consumer item at the location, the second availability computed with one additional draw unit of the consumer item allocated to the location in comparison to the draw units allocated for computation of the first availability and the maximum incremental availability is a maximum of the incremental availability of the consumer item computed for each location of the plurality of locations, and wherein the determining the location step determines a location that has the maximum incremental availability.

20. The machine readable storage medium of claim 18 wherein the at least one constraint is based on performance metrics including at least one of safety stock, expected sellout, expected stockout, or expected return.

* * * * *

UNITED STATES PATENT AND TRADEMARK OFFICE
CERTIFICATE OF CORRECTION

PATENT NO. : 8,036,958 B2
APPLICATION NO. : 12/693311
DATED : October 11, 2011
INVENTOR(S) : Feldman et al.

Page 1 of 2

It is certified that error appears in the above-identified patent and that said Letters Patent is hereby corrected as shown below:

In column 2, line 30, delete "$X_u$," and insert -- $X_{ij}$,--, therefor.

In column 2, line 53, after "and" insert -- $\lambda_{ij}$ --.

In column 3, line 12, delete "$EST(\lambda,D)$," and insert -- $EST(\lambda_{ij},D_{ij})$, --, therefor.

In column 4, line 66-67, delete
" $w_1(\% \ ER(\lambda,D) - \% \ ER(\lambda,D^0) + w_2(\% \ ESO(\lambda,D^0) - \% \ ESO(\lambda,D))$ or " and
insert -- $w_1(\%ER(\lambda,D) - \%ER(\lambda,D^0)) + w_2(\%ESO(\lambda,D^0) - \%ESO(\lambda,D))$ or --, therefor.

In column 5, line 5-6, delete
" $w_1(\% \ ER(\lambda,D) - \% \ ER(\lambda,D^0) + w_2(\% \ EST(\lambda,D^0) - \% EST(\lambda,D))$ " and
insert -- $w_1(\%ER(\lambda,D) - \%ER(\lambda,D^0)) + w_2(\%EST(\lambda,D^0) - \%EST(\lambda,D))$ --, therefor.

In column 6, line 57, delete "$\lambda_i$" and insert -- $\lambda_{ij}$ --, therefor.

In column 7, line 23-26, delete
$$ER(\lambda_j,D_j) = f(\lambda_j,D_j-1) + (D_j-\lambda_j)F(\lambda_j,D_j-2)$$
" $EST(\lambda_j,D_j) = f(\lambda_j,D_j) + (\lambda_j-D_j)(1-F(\lambda_j,D_j-1))$ " and insert
$$ER(\lambda_j,D_j) = D_j \ f(\lambda_j,D_j-1) + (D_j-\lambda_j)F(\lambda_j,D_j-2)$$
-- $EST(\lambda_j,D_j) = D_j \ f(\lambda_j,D_j) + (\lambda_j-D_j)(1-F(\lambda_j,D_j-1))$ --, therefor.

Signed and Sealed this
Twenty-seventh Day of December, 2011

David J. Kappos
*Director of the United States Patent and Trademark Office*

In column 7, line 36, delete "$\max_i$" and insert -- $\max_j$ --, therefor.

In column 8, line 27-28, delete "$w_1 (\% ER(\lambda,D) - \% ER(\lambda,D^0) + w_2(\% ESO(\lambda,D^0) - \% ESO(\lambda,D)))$" and insert -- $w_1 (\% ER(\lambda,D) - \% ER(\lambda,D^0)) + w_2(\% ESO(\lambda,D^0) - \% ESO(\lambda,D))$ --, therefor.